Patented Oct. 5, 1937

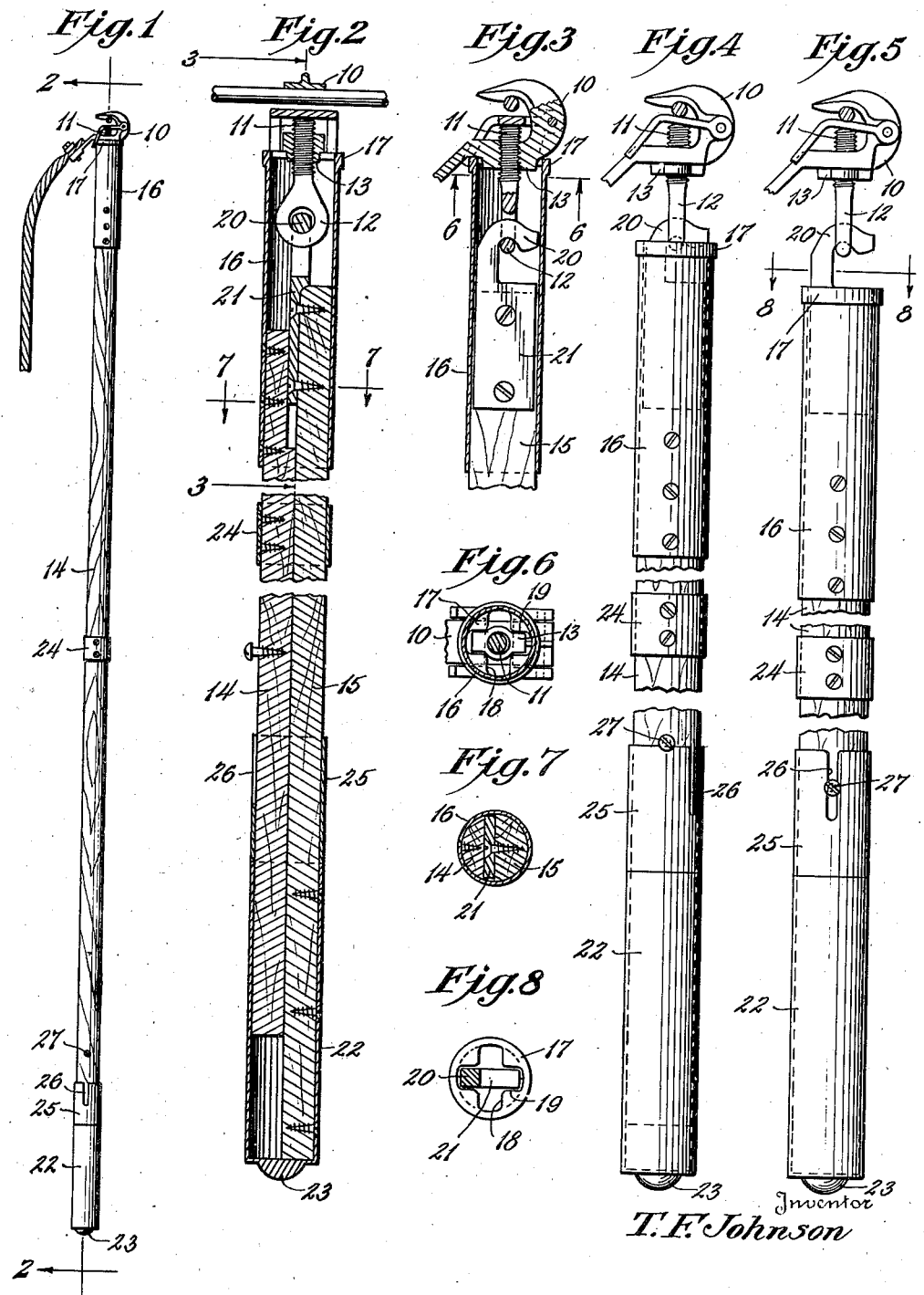

2,095,137

UNITED STATES PATENT OFFICE 2,095,137

OPERATING IMPLEMENT FOR HOT LINE CLAMPS

Tomlinson F. Johnson, Atlanta, Ga.

Application October 21, 1935, Serial No. 46,014

6 Claims. (Cl. 81—53)

This invention relates to a tool or operating implement for holding, applying, tightening and releasing a screw clamp used for connecting a lead or tap to a live conductor or transmission line. One of the objects of the invention is to provide a relatively simple, compact and convenient implement having relatively movable parts and provided with means for engaging the screw eye of a well known type of screw clamp and adapted to be manipulated by a lineman, first, to grip the clamp firmly when applying it to a live line, then, to tighten the screw, while permitting universal movement of the implement with respect thereto and preventing disengagement therefrom, and, finally, to move the parts to a position wherein the implement may be disengaged from the screw eye to leave the clamp secured on the live line. Furthermore, the invention aims to provide a novel type of head to cooperate with a hook to coact with a standard screw eye and also grip against the body of the clamp.

Other aims and advantages of the invention will appear in the specification, when considered in connection with the accompanying drawing, wherein:

Fig. 1 is a side elevation of a manipulating implement embodying the invention and showing a screw clamp held thereby in engagement with a conductor;

Fig. 2 is a sectional view on an enlarged scale, taken on the line 2—2 of Fig. 1;

Fig. 3 is a fragmentary sectional view taken on the line 3—3 of Fig. 2;

Fig. 4 is a side elevation of the implement showing the clamp secured to the conductor;

Fig. 5 is a similar side elevation showing the implement with its parts in position to be released from the screw eye;

Fig. 6 is a sectional view taken on the line 6—6 of Fig. 3;

Fig. 7 is a sectional view taken on the line 7—7 of Fig. 2; and

Fig. 8 is a sectional view taken on the line 8—8 of Fig. 5.

Referring particularly to the drawing, the implement there shown is designed to apply and operate a clamp 10 having a screw 11 and an ordinary screw eye 12. While there are a great many screw clamps of this general type, the one here shown is similar to that covered in my Patent No. 1,900,990 issued March 12, 1933, the only difference being that the present type of clamp has an elongated boss 13 below the bottom jaw portion around the screw 11 for a purpose later to be fully explained.

In this example, the operating parts of the implement are shown as being made of two complemental elongated sections of wood 14 and 15, each semi-circular in cross section to provide a round handle. The section 14 is shorter than the section 15 and they are longitudinally slidable relative to each other. For the purpose of explanation, the section 14 will be described as being moved on the section 15. Section 14 carries a hollow cylindrical sleeve or ferrule 16 secured at its upper end providing a guide for the section 15 and presents a head portion 17 in the form of a closed end having cruciform elongated slots 18 and 19 intersecting each other on the axis of the stick. Both slots are shown as being of the same shape and are adapted to accommodate the boss 13 on the clamp so that the clamp cannot rotate on the head when so engaged. However, some clamps do not have this type of boss, but may be frictionally held on or gripped against the stick head, as will presently be explained.

The stick section 15 is shown as having a hook 20 on a flat plate 21 secured by screws to its inner face and the other section 14 of the stick is cut away to accommodate the plate. The width of the hook is only slightly less than the internal diameter of the sleeve 16 so that it cannot be disengaged from the screw eye 12 when the hook is retracted into the sleeve. It is adapted to be projected from the sleeve through the slot 19 initially to engage the eye 12 or to be disengaged therefrom, as shown in Fig. 5.

The stationary section 15 of the stick is shown as having a cylindrical hand grip 22 in the form of a sleeve secured to its lower end portion and also providing a guide for the movable section 14. It has a closed end wall or head 23 which reinforces the lower end of the stick and also provides a stop for the movable section. To enable the operator to manipulate the stick, the slidable section 14 is shown as having a short metal sleeve or ferrule 24 secured to it intermediate its ends and providing a second hand grip 22, the arrangement being such that the operator may grasp the handle 22 in one hand and slide the section 14 up and down by grasping the ferrule and pushing or pulling on it either to expose the hook as shown in Fig. 5, or to conceal it within the sleeve 16 as shown in Fig. 3. A stop sleeve 25 having a longitudinal notch or slot 26 is loosely mounted on both sections of the stick above the hand grip 22. It is adapted to cooperate with a pin or screw 27 projecting radially from the section 14 to provide means for limiting the sliding movement of said section and hold the parts in two of their operating positions.

Assuming that the section 14 has been retracted or pulled downwardly on the section 15 to expose the bill of the hook 20 as shown in Fig. 5, it will be noted that the sleeve 25 is turned so that the shank of the screw 27 slides in the slot 26. If it is desired to apply a clamp with its lead to a conductor, the screw is unscrewed and the hook inserted in its eye. Then, the stick section 14 is pushed upwardly so that the sleeve 16 conceals the hook and eye and the head 17 engages the lower jaw portion of the clamp with the elongated boss 13 seated in one or the other of the slots, depending on the position of said boss with respect to the screw eye. As pressure is applied to the ferrule 24 and the stick section 14, the clamp will be held in its gripped position, relatively immovable on the stick head, whether or not the clamp has a boss. However, the locking boss positively prevents rotation of the clamp on the head and this is very desirable because an operator otherwise might have difficulty in guiding the clamp on a conductor while he is in a rather uncomfortable or precarious position. While the parts are in this position, it will be noted that the screw or pin 27 has been moved and above the upper end of the sleeve 25.

As soon as the clamp has been hooked on the conductor as shown in Figs. 1 to 3, the operator can release the stick from its gripping engagement with the clamp. He is then ready to rotate the screw to tighten the clamp. To do this, and at the same time, prevent the hook from being accidentally disengaged from the screw eye, he first rotates the sleeve 25 to any position wherein the slot 26 does not register with the screw 27. Then, he releases the ferrule 24 and permits the slidable section 14 to move downwardly to the position shown in Fig. 4, when the screw 27 will engage the upper end of the sleeve 25 and prevent the section 14 from moving further to expose the hook. It will be noted that in this position of the parts, the bill of the hook is only partially exposed above the head, while the screw eye 12 has sufficient clearance between the hook and the head to permit universal angular movement of the stick relative to the screw eye. This enables an operator who may be in an offset position with respect to the clamp, to rotate the screw by turning the stick with the hand grip 22. However, the eye remains loosely locked between the hook and head of the stick until the operation is completed and the sleeve 25 is again rotated to bring the slot 26 into registry with the shank of the screw 27. Then, the parts will automatically assume the position shown in Fig. 5, when the hook is ready to be disengaged from the screw eye. The parts may remain in this position until the operator is ready to apply another clamp in the same location or wishes to use the implement in place of a switch stick or switch hook. It is desirable in most cases, however, to advance the head on the hook or retract the hook to the position shown in Fig. 4 when the stick is carried from place to place to prevent damage to the hook.

From the foregoing description, it will be seen that the operating implement is relatively simple and rugged in its construction and is very easy to manipulate. While the stick is shown as being made of wooden sections, it will be understood that they can be made of any suitable non-conducting material. The two sections are not necessarily semi-circular in cross section, but it is contemplated that one part may be housed within the other. Moreover, the proper use of the stick will enable an operator to save considerable time in applying and removing tap clamps because the hook is held in engagement with the clamp until either operation is completed. Furthermore, the implement is adapted to be used as an ordinary switch stick to operate fuses, switches and other equipment provided with eyes for the hook to enter.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A manipulating implement for hot line, screw-operated clamps having screw eyes comprising, in combination, a pair of elongated members made of insulating material connected for sliding movement relative to each other; a slotted metal head on the upper end of one member shaped to engage the bottom of a clamp body; and an eye engaging device on the upper end of the other member adapted to project through said slotted head, said head and eye engaging device coacting in one position of the members to grip the body of a clamp and hold it immovable on the implement for application to a hot line and, in another position of the members, to lock the eye engaging device loosely in turning engagement with the screw eye and thereby permit universal movement of the implement while it is manipulated to turn the screw.

2. A manipulating implement for hot line, screw-operated clamps having screw eyes comprising, in combination, a pair of elongated stick members made of insulating material connected for sliding movement relative to each other; a metal sleeve on the upper end of one of said members having a slotted head shaped to engage the bottom of a clamp body; a hook secured to the upper end of the other member adapted to be withdrawn through the slotted head into said sleeve and projected through the head to engage a screw eye; and hand grips on said members whereby they may be manipulated to engage and hold the body of a clamp immovable for application to a hot line, to lock the hook loosely in engagement with the screw eye and thereby permit universal movement of the implement while it is manipulated to turn the screw and finally to permit the release of the hook from the screw eye.

3. A manipulating implement for hot line, screw-operated clamps having screw eyes comprising, in combination, a pair of elongated members made of insulating material connected for longitudinal sliding movement relative to each other; a metal head on one member shaped to engage and interlock with a clamp body; and an eye engaging device on the other member cooperating with the head to grip the body of a clamp against the head when the members are moved to one position, release the grip on the clamp body and loosely lock the engaging device in turning engagement with the screw eye to permit universal movement of the implement while it is manipulated to turn the screw, when the members are in another position, and to permit the eye engaging device to be removed from its engagement with the screw when the members are in still another position.

4. A manipulating implement for hot line clamps having screw eyes comprising, in combination, a stick of insulating material having two parts longitudinally slidable relative to each other and adapted to be manipulated by both hands of an operator; a sleeve on the upper end of one part having a slotted head to receive a screw eye; a hook on the end of the other part within the sleeve adapted to be projected through the head to be inserted in the screw eye and withdrawn through the head with the engaged eye so that the head may be forced against the clamp around the screw and hold the clamp while it is being applied to a conductor and, then, partially projected through the head to a position in which the head prevents accidental disengagement of the eye from the hook but permits universal angular movement of the stick relative to the eye while the stick is being turned to operate the screw; and releasable stop means to hold the stick parts in the screw-operating position.

5. A manipulating implement for hot line, screw-operated clamps having screw eyes comprising, in combination, a pair of complemental elongated stick members made of insulating material, each semi-circular in cross section and connected for sliding movement relative to each other; a sleeve secured to the upper end portion of one of said members and guiding the other member to slide therein; a head on the upper end of said sleeve having a cruciform slot; an eye engaging hook on the upper end of the other member adapted to be withdrawn into said sleeve through the slotted head; an elongated ferrule on the lower end of said member carrying the hook providing a hand grip for said member and a combined guide and stop for the lower end of the other member; a spaced ferrule on said other member providing another hand grip and guide; a rotatable sleeve on the lower portion of said members abutting the hand grip and having a longitudinal slot therein; and a pin projecting radially from the sleeve carrying member above said sleeve coacting with its upper end and with the bottom of said slot to hold the parts in two of their operating positions, said hook being adapted to be projected through the head to be engaged with a screw eye, then retracted through the head with the engaged screw eye to grip the head against the body of the clamp, then partially projected through the head to a position in which the head cooperates therewith to lock it loosely in its turning engagement with the screw eye and thereafter fully projected through the head to permit it to be released from the screw eye.

6. A manipulating implement for hot line clamps of the character described having screw eyes comprising two complemental parts of semi-circular cross section made of insulating material and connected for longitudinal sliding movement relative to each other; a sleeve on the upper end of one of said members providing a guide for the upper end of the other member; a head on the upper end of said sleeve having transverse cruciform slots and adapted to engage and interlock with a clamp body; an eye engaging hook on the other member adapted to be retracted through one of the slots in the head into the sleeve; and means to manipulate said members so that said hook may be engaged with a screw eye and the head gripped against the clamp body to hold it immovable for application to a hot line, then, to withdraw the head from its clamping engagement to a position wherein it cooperates with the hook to hold the hook loosely in engagement with the eye for subsequent turning movement and, finally, to retract the head below the hook so that the hook projects therefrom and may be disengaged from the screw eye.

TOMLINSON F. JOHNSON.